UNITED STATES PATENT OFFICE.

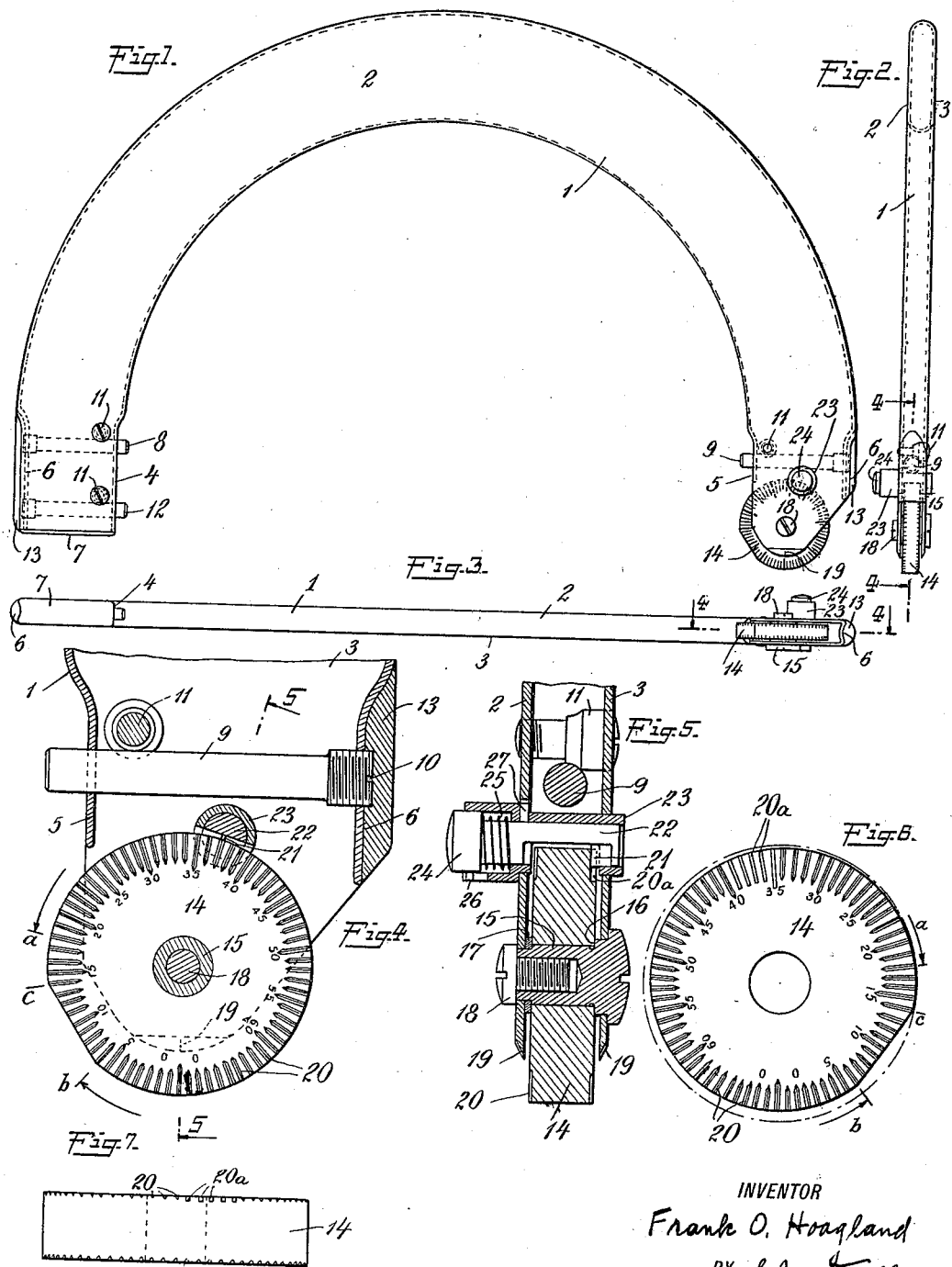

FRANK O. HOAGLAND, OF HARTFORD, CONNECTICUT, ASSIGNOR TO PRATT & WHITNEY COMPANY, OF NEW YORK, N. Y., A CORPORATION OF NEW JERSEY.

LIMIT-GAGE.

1,311,349.

Specification of Letters Patent.   Patented July 29, 1919.

Application filed April 23, 1918.  Serial No. 230,234.

*To all whom it may concern:*

Be it known that I, FRANK O. HOAGLAND, a citizen of the United States, residing at Hartford, in the county of Hartford and State of Connecticut, have invented certain new and useful Improvements in Limit-Gages, of which the following is a specification.

The principal object of the invention is to provide a limit gage having one of its maximum-distance contacts in the form of a cam so constructed that it can be readily moved out of normal position and used to measure the amount by which the piece being gaged exceeds the maximum permissible size. A further object of the invention is to provide certain improved detailed features whereby I obtain a construction which is simple and compact and which reduces the possibility of error to a minimum. Other objects of the invention will be apparent from the following specification and claims.

In the accompanying drawing I have shown the embodiment of the invention which I now prefer, but it will be understood that changes may take place within the scope of the appended claims without departing from the spirit of the invention.

Of the drawing:

Figure 1 is a side view of a gage embodying the invention.

Fig. 2 is an end view.

Fig. 3 is a bottom view.

Fig. 4 is a fragmentary enlarged sectional view taken along the lines 4—4 of Fig. 2 and Fig. 3.

Fig. 5 is a fragmentary sectional view taken along the line 5—5 of Fig. 4.

Fig. 6 is a detailed view of the measuring cam showing the side opposite to that shown in Fig. 4.

Fig. 7 is an edge view of the measuring cam.

In the drawing I have shown a gage which is in many respects similar to that shown in my copending application for limit gages, Serial No. 212,596, filed January 19th, 1918. My present invention is particularly applicable to a gage of this type but so far as certain features of the invention are concerned, it is applicable to a gage of a different type.

As illustrated, 1 represents the main body of the gage which is constructed from a metallic tube. The tube is bent into a U-shaped form, as shown, and is flattened at opposite sides to form flat walls 2 and 3. Except at the ends, the metal of the tube extends in uniform semi-circular curves between the two walls 2 and 3, thus providing an oval cross section. At the ends the tube has straight sections which are parallel and which have opposed inner flat walls 4 and 5 extending perpendicularly between the walls 2 and 3. The outer wall of each end section of the tube is preferably bent inward to form a recess, as indicated at 6. One end of the tubular body is closed, preferably by means of a flat plate 7 which is held in place in any suitable manner, as for instance by brazing. The edges of the plate 7 are rounded to eliminate sharp corners or angles.

Carried by the parallel end sections of the gage is a pair of opposed measuring contacts 8 and 9 which extend through alined apertures in the inner and outer walls of the end sections of the body. As illustrated most clearly in Fig. 4, the aperture in the inner wall is smooth and the aperture in the outer wall is slightly larger and is suitably threaded. Each measuring contact has a main cylindrical part which closely fits the aperture in the inner wall, and an enlarged outer threaded part which fits the threaded aperture in the outer wall. Each contact has a slot 10 or other means permitting it to be readily turned. By means of a screw driver fitting the slot the measuring contact can be adjusted to any desired position. For locking each contact in adjusted position, I provide a screw 11 which extends through apertures in the side walls 2 and 3. The enlarged head of the screw fits the larger aperture in the wall 3 and the smaller threaded end of the screw fits the smaller threaded aperture in the wall 2. The head of the screw is provided with a curved annular surface which is adapted to press against and fit the cylindrical part of the corresponding measuring contact. Then when the screw 11 is tightened the measuring contact is locked against movement.

At the closed end of the gage there is provided a measuring contact 12 which is similar to the contact 8 and which is similarly held, being adapted to be locked by a screw 11.

To prevent unauthorized adjustment of the contacts 8, 9 and 12, I preferably fill the recesses 6 with sealing wax, as indicated at 13. This sealing wax is molded to conform to the general outer contour of the body part of the gage and it therefore serves to provide a smooth outline as well as to prevent adjustment.

At the open end of the tubular body there is mounted a measuring contact adapted to coöperate with the contact 12. This contact is in the form of a cam 14. The cam is disk-like in form and is rotatably mounted on a pivot pin 15 which extends through suitable apertures in the walls 2 and 3. The pivot pin 15 is exactly opposite the measuring contact 12. As illustrated most clearly in Fig. 5, the pin 15 has a shoulder 16 engaging one side of the cam 14. The other side of the cam 14 is engaged by a washer 17 interposed between the cam and the wall 2. A screw 18 is threaded into a central aperture in the pin 15, the head of the screw engaging the outer surface of the wall 2 and holding the pin 15 in place.

The measuring contact 12 is adjusted so that when the cam 14 is in its normal position, as shown in the drawings, the distance between them is the maximum permissible size of the piece to be gaged. Thus adjusted the contacts 12 and 14 constitute maximum-distance contacts. The contacts 8 and 9 are relatively adjusted so that the distance between them is the minimum permissible size of the piece to be gaged. The contacts 8 and 9 thus constitute minimum-distance contacts. With the parts adjusted in this manner the gage can be used in the usual way, and the piece to be gaged must "go" between the contacts 12 and 14 but must "not go" between the contacts 8 and 9.

It is frequently desirable for the machinist, when he finds upon trial that the piece being machined is too large, to know just how much too large it is in order that he may properly set his tool for an additional cut. My improved gage permits him to readily determine this. The outer surface of the measuring cam 14 is spiral in form, uniformly decreasing in radius from the point $a$ to the point $b$ as indicated by the curved arrows. For the gage shown this decrease in radius is .060″.

The end parts of the walls 2 and 3 adjacent the measuring cam are rounded or beveled and one or preferably each of them is provided with an indicating mark 19. One surface of the cam 14 is provided with indicating marks. These marks may be on one or preferably on each side surface near the edge as indicated at 20. The marks 20 on each side of the cam are adapted to coöperate with the corresponding mark 19 on the body wall 2 or 3. Preferably the marks 20 are radial and are in the form of small V-shaped grooves or notches. Adjacent the grooves are suitable designating numerals, in the present case the numerals running from 0 to 60 at intervals of five. The numerals are so arranged that when the zero mark is opposite 19 the cam will be in position to indicate the maximum permissible distance, as before described. As before stated, the decrease in radius from the point $a$ to the point $b$ in the present case is .060″. In this same arc there are sixty divisions, each division thus representing .001″ decrease in radius. If the operator turns the cam to a position such that the gage will pass the piece being measured, the reading on the cam opposite the mark 19 will indicate in thousandths of an inch the amount by which the piece being measured is in excess of the maximum permissible size.

Preferably, to prevent free pivotal movement of the cam 14, I provide a suitable holding means. This holding means is preferably in the form of a detent 21 adapted to engage the marking grooves or notches 20 on one side of the disk. As illustrated, this detent is formed as a part of a plunger 22 longitudinally movable in a bushing 23 positioned in apertures in the walls 2 and 3. The bushing 23 is cut away at one side to permit access to the cam, and the plunger 22 is recessed adjacent the detent 21. At the end of the plunger opposite the detent is an enlarged head 24 which fits an enlarged part of the bushing 23. Positioned within the bushing and engaging the head is a coil spring 25 which serves to press the head outward and thus to resiliently hold the detent 21 in engagement with the notches of the cam. A pin 26 prevents the plunger from turning in the bushing 23 and a pin 27 prevents the bushing from turning with respect to the body of the gage. It will be seen that the construction described serves to resiliently hold the cam 14 in any position to which it may be moved, but nevertheless permits it to be manually moved when desired, the detent 21 being forced out of one groove 20 and moving into another groove 20 under the action of the spring 25.

Preferably a part of the outer surface of the cam from the point $a$ to the point $c$ is concentric. It will be obvious that any part of this concentric surface may be positioned opposite the contact 12 for indicating the maximum permissible size of the piece being gaged. As indicated, this concentric section of the cam extends over four divisions, thus presenting five different normal or zero positions, these being represented by five zero marks, as indicated. Any one of the five zero marks 20 may be placed opposite the corresponding mark 19 without changing the distance between the contact 12 and the surface of the cam 14. This arrangement prevents excessive wear on the cam at any one zero point. Preferably the notches which are engaged by the detent 21 when the cam is in zero position, are deeper than the other notches, as indicated at 20ª. These notches have perpendicular sides so that when the detent 21 has entered one of them it will positively hold the cam 14 against movement. Therefore, when the detent is engaged in one of the notches 20ª, the gage can be used in the usual manner without any danger of the cam being moved so as to give an erroneous reading. When the operator desires to move the cam from the zero position, this can be done by pressing on the head 24 of the plunger 22 and then moving the detent 21 out of engagement with the cam. Then the cam can be turned, the detent being permitted to engage one of the notches 20.

What I claim is:

1. A limit gage comprising in combination opposed minimum-distance measuring contacts in normally fixed relation to each other and opposed maximum-distance measuring contacts of which one is in the form of an adjustable spiral cam, the distance between the last said contacts having a normally fixed minimum value slightly greater than that between the minimum-distance contacts.

2. A limit gage comprising in combination opposed minimum-distance measuring contacts in normally fixed relation to each other and opposed maximum-distance measuring contacts of which one is in the form of an adjustable pivotally mounted spiral cam having surface markings to indicate the changes in distance resulting from its adjustment, the distance between the last said contacts having a normally fixed minimum value.

3. A limit gage comprising in combination opposed minimum-distance measuring contacts in normally fixed relation to each other and opposed maximum-distance measuring contacts of which one is in the form of an adjustable pivotally mounted spiral cam, the distance between the last said contacts having a normally fixed minimum value, and means engaging the cam to prevent free pivotal movement thereof.

4. A limit gage comprising in combination opposed minimum-distance measuring contacts in normally fixed relation to each other and opposed maximum-distance measuring contacts of which one is in the form of an adjustable pivotally mounted spiral cam, the distance between the last said contacts having a normally fixed minimum value, and a spring-pressed element engaging the cam to prevent free pivotal movement thereof.

5. A limit gage comprising in combination opposed minimum-distance measuring contacts in normally fixed relation to each other and opposed maximum-distance measuring contacts of which one is in the form of an adjustable pivotally mounted spiral cam having spaced notches in one of the surfaces thereof, the distance between the last said contacts having a normally fixed minimum value, and a spring-pressed detent coöperating with the notches to yieldably hold the cam in adjusted position.

6. A limit gage comprising in combination opposed minimum-distance measuring contacts in normally fixed relation to each other and opposed maximum-distance measuring contacts of which one is in the form of an adjustable pivotally mounted spiral cam having spaced notches in one of the side surfaces thereof, the distance between the last said contacts having a normally fixed minimum value, means coöperating with the notches to enable them to serve as indicating marks, and a spring-pressed detent coöperating with the notches to yieldably hold the cam in adjusted position.

7. A limit gage comprising in combination opposed minimum-distance measuring contacts in normally fixed relation to each other and opposed maximum-distance measuring contacts of which one is in the form of an adjustable pivotally mounted spiral cam, and releasable means for holding the cam the distance between the last said contacts having a normally fixed minimum value, in a definite predetermined "zero" position.

8. A limit gage comprising in combination opposed measuring contacts, one of the said contacts being in the form of an adjustable pivotally mounted spiral cam having spaced notches in one of the surfaces thereof and having a supplemental notch deeper than the others, and a spring-pressed detent coöperating with the notches to yieldably hold the cam in adjusted position and adapted to enter the deeper supplemental notch to positively hold the cam in a definite predetermined "zero" position.

9. A limit gage comprising in combination opposed measuring contacts, one of the said contacts being in the form of an adjustable pivotally mounted cam having a concentric peripheral section, and means for holding the cam with any one of a plurality of parts of the concentric section opposite the companion measuring contact.

10. A limit gage comprising in combination opposed measuring contacts, one of the said contacts being in the form of an adjustable pivotally mounted cam having a concentric peripheral section and having a plurality of spaced notches in a surface thereof, and a spring-pressed detent adapted to enter any one of the notches to positively hold the cam with any one of a plurality of parts of the concentric section opposite the companion measuring contact.

11. A limit gage comprising in combination opposed measuring contacts, one of the said contacts being in the form of an adjustable pivotally mounted cam having a spiral peripheral section and a concentric peripheral section and having a plurality of spaced notches in a surface thereof and also a plurality of supplemental deeper notches in the said surface, and a spring-pressed detent adapted to coöperate with any one of the first said notches to yieldably hold the cam in adjusted position and adapted to enter any one of the supplemental deeper notches to positively hold the cam with any one of a plurality of parts of the concentric section opposite the companion measuring contact.

12. A limit gage comprising in combination a hollow sheet metal body, and opposed measuring contacts, one of the said contacts being in the form of an adjustable spiral cam pivotally mounted between opposite walls of the body.

13. A limit gage comprising in combination a hollow sheet metal body, opposed minimum-distance contacts carried by the body, and opposed maximum-distance measuring contacts carried by the body, one of the last said contacts being in the form of an adjustable spiral cam pivotally mounted between opposite walls of the body.

14. A limit gage comprising in combination a hollow sheet metal body, and opposed measuring contacts, one of the said contacts being in the form of an adjustable spiral cam having indicating marks on the sides thereof and pivotally mounted between opposite walls of the body the said walls having marks to coöperate with the marks on the sides of the cam.

15. A limit gage comprising in combination a hollow sheet metal body, opposed measuring contacts, one of the said contacts being in the form of an adjustable spiral cam pivotally mounted between opposite walls of the body, and means engaging the cam to prevent free pivotal movement thereof, the said means comprising a plunger movable perpendicularly to the said opposite walls through apertures therein.

In testimony whereof, I hereunto affix my signature.

FRANK O. HOAGLAND.

Copies of this patent may be obtained for five cents each, by addressing the "Commissioner of Patents, Washington, D. C."

It is hereby certified that in Letters Patent No. 1,311,349, granted July 29, 1919, upon the application of Frank O. Hoagland, of Hartford, Connecticut, for an improvement in "Limit-Gages," errors appear in the printed specification requiring correction as follows: Page 3, line 91, claim 7, after the word and comma "cam," insert the clause *the distance between the last said contacts having a normally fixed minimum value,* ; same page and claim, commencing with the article "the," line 93, as now numbered, strike out all to and through the word "value," line 94; and that the said Letters Patent should be read with these corrections therein that the same may conform to the record of the case in the Patent Office.

Signed and sealed this 30th day of September, A. D., 1919.

[SEAL.]

M. H. COULSTON,

*Acting Commissioner of Patents.*

Cl. 33—143.